Z. TAMASSY.
AUTOMATIC SPEED CONTROLLING MEANS FOR ENGINES.
APPLICATION FILED DEC. 4, 1911.

1,066,235.

Patented July 1, 1913.

ATTEST
E. M. Fisher
F. C. Musson.

INVENTOR
Zoltan Tamassy
By Fisher & Moser ATTYS.

UNITED STATES PATENT OFFICE.

ZOLTAN TAMASSY, OF CLEVELAND, OHIO.

AUTOMATIC SPEED-CONTROLLING MEANS FOR ENGINES.

1,066,235.   Specification of Letters Patent.   Patented July 1, 1913.

Application filed December 4, 1911. Serial No. 663,707.

*To all whom it may concern:*

Be it known that I, ZOLTAN TAMASSY, a subject of Hungary, residing at Cleveland, in the county of Cuyahoga and State of Ohio, have invented certain new and useful Improvements in Automatic Speed-Controlling Means for Engines; of which the following is a specification.

My invention relates to automatic speed controlling means for engines, particularly automobile engines, and the invention comprises an automatic device operatively connected with the engine and its throttle valve, whereby the supply of power fluid for the engine may be definitely regulated and cut off at different predetermined speeds of the engine, substantially as herein shown and described and more particularly pointed out in the claim.

Figure 1:
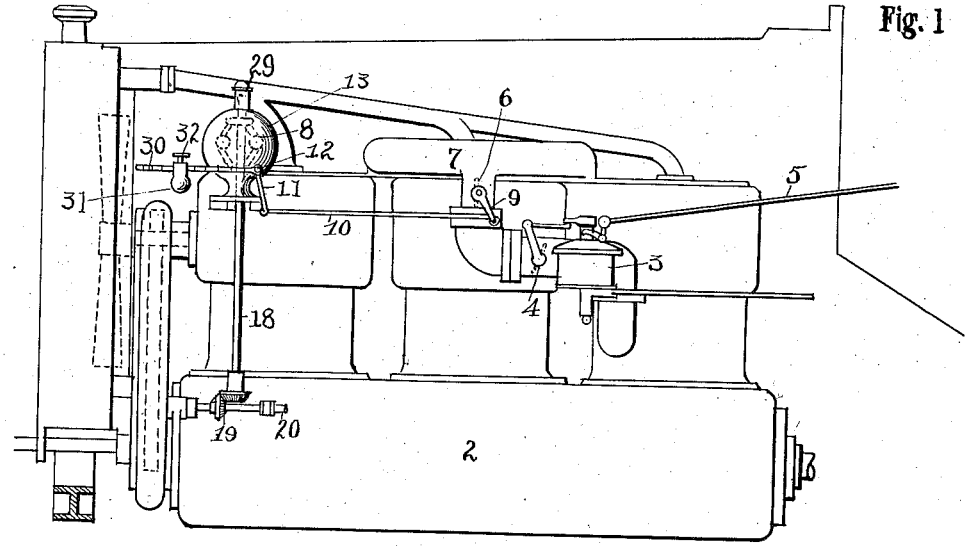
Figure 2:
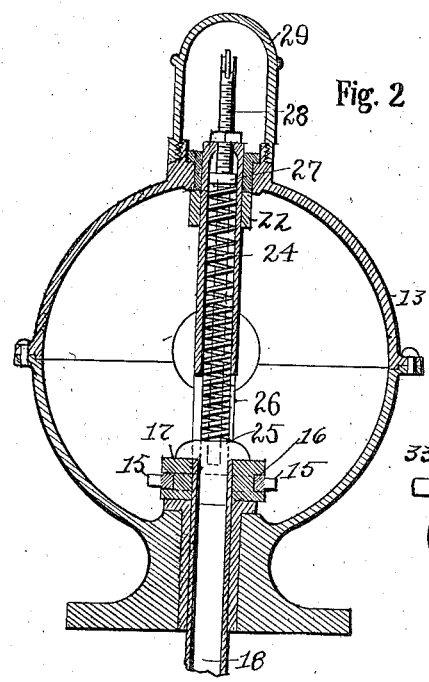
Figure 3:
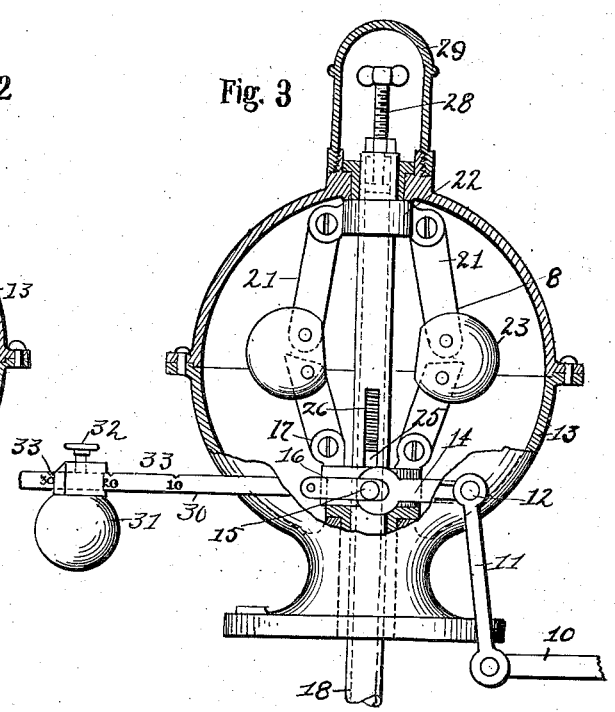

In the accompanying drawings, Figure 1 is a side view of an automobile engine showing my invention incorporated therewith. Fig. 2 is a sectional view centrally through the governor portion of the device, and Fig. 3 is a side view partly in section of the same parts, but at right angles to Fig. 2.

As shown, the invention is applied to an internal combustion engine 2 having a carbureter 3 to supply air and gasolene as usual. A throttle valve 4 is also shown, which is representative of the usual device or devices for regulating the vapor supply to the engine, and whereby the power and speed thereof may be constantly under hand or foot control through a link or rod connection 5 which leads to the seat of the vehicle.

Now, my object is to supplement the foregoing means with an automatically-operated throttle valve 6 placed in the line of intake pipe 7 which connects carbureter 3 with the engine. This valve 6 controls the amount of vapor passing to the engine independently of the usual throttle 4, but does not operate except at predetermined intervals.

In simple terms, my object is to fix any one of several maximum speeds at which the vehicle may be operated, and to accomplish this purpose I connect a ball governor 8 with the arm 9 of throttle valve 6 by link 10, which is attached to arm 11 of a short shaft 12 which projects from the globular casing 13 confining the governor 8. The inner end of the shaft 12 has a slotted arm or arms 14 engaged with a trunnion or trunnions 15 on a free ring 16 within the annular recess of rotatable collar 17, which is also slidably sleeved on tubular shaft 18. This shaft is driven from and by the power parts of engine 2 through bevel gearing 19 and countershaft 20, or by any other suitable power connections, such as flexible shafting.

Obviously, when the engine 2 is running, shaft 18 is also running at a corresponding speed. Therefore, ball governor 8 which is connected to shaft 18 by links 21 and collar 22 will also be rotated, but it is not my intention to have valve 6 respond immediately to the rotation of shaft 18, or to be sensitive thereto during the ordinary operation of the engine, excepting when predetermined maximum speeds are exceeded. Then and only then will the governor 8 be permitted to perform its functions under the centrifugal action of its balls 23 and whereby collar 17 is lifted and shaft 12 rotated by arm 14. At all other times the lift movement of the governor is held in check by means which comprises both a spring and a counterweight,—the spring 24 being contained within the upper end of tubular shaft 18 where it rests upon a T-shaped member 25 which has lateral arms projecting through slots 26 in the sides of shaft 18 and bearing down upon collar 17. The upper end of the spring has a loose head 27 which is engaged by a thumb screw adjustably secured in the upper end of shaft 18 and wherewith more or less tension may be given to spring 24. A cap or cover 29 is screwed upon casing 13 to conceal and protect the screw 28, so that its adjustment may remain undisturbed.

The counterweighted means for controlling the action of the governor comprises an arm 30 secured to the outer end of shaft 12 and upon which a counterweight 31 is free to slide and to be set by set-screw 32 at different distances from the shaft 12, and as marked thereon by notches 33. Of course spring 24 and counterweight 31 co-act to check the up-lift of governor 23; but the spring is more particularly intended to remain undisturbed after it has once been set and the engine found to run satisfactorily under certain conditions. On the other hand, the counterweight 31 is placed outside of casing 13 where the operator of the machine may adjust it at any time to fix the maximum power and speed to be obtained from engine 2.

To illustrate, let us assume that the maximum speed (measured by the speed of the vehicle) is to be fixed at thirty miles per hour; then counterweight 31 would be placed and set as shown in Fig. 3 at the notch having indicating mark 30. Whereupon, in operation, governor 8 will not respond to the movement of the engine until its speed reaches the thirty miles fixed as the maximum and the checking effect of the counterweight 31 is overcome, and then and not until then is throttle 6 actuated to cut down the flow of combustible fluid to the engine. Obviously, when the fluid supply is thus diminished or cut off temporarily, the speed of the engine will be correspondingly influenced, and no greater speed than that predetermined can be obtained.

What I claim is:

In means for automatically limiting the speed of a driven part, a spherical casing, a tubular shaft vertically disposed in said casing, a ball governor mounted on said shaft and rotatable within said casing, a spiral spring confined in said shaft and means at its top to fix the tension thereof, a collar slidably mounted on said shaft and bearing against the lower end of said spring and the said governor connected with said collar in lifting relations, and a counterweighted arm engaging said collar and adapted to resist the action of said governor when running within predetermined maximum speeds, the said arm and the said spring being combined in function to resist the action of the said governor and the said arm having its counterweight outside the said spherical casing.

In testimony whereof I affix my signature in presence of two witnesses.

ZOLTAN TAMASSY.

Witnesses:
R. B. MOSER,
F. C. MUSSUN.